United States Patent
Goli

(10) Patent No.: US 10,404,797 B2
(45) Date of Patent: Sep. 3, 2019

(54) SUPPORTING MULTIPLE CLIPBOARD ITEMS IN A VIRTUAL DESKTOP INFRASTRUCTURE ENVIRONMENT

(71) Applicant: Wyse Technology L.L.C., Santa Clara, CA (US)

(72) Inventor: Nihar Goli, Karimnagar (IN)

(73) Assignee: Wyse Technology L.L.C., Santa Clara, CA (US)

( * ) Notice: Subject to any disclaimer, the term of this patent is extended or adjusted under 35 U.S.C. 154(b) by 298 days.

(21) Appl. No.: 15/448,816

(22) Filed: Mar. 3, 2017

(65) Prior Publication Data

US 2018/0255134 A1  Sep. 6, 2018

(51) Int. Cl.
*G06F 15/16* (2006.01)
*H04L 29/08* (2006.01)
*H04L 29/06* (2006.01)

(52) U.S. Cl.
CPC .......... *H04L 67/1095* (2013.01); *H04L 67/42* (2013.01)

(58) Field of Classification Search
USPC .......................................................... 709/217
See application file for complete search history.

(56) References Cited

U.S. PATENT DOCUMENTS

| | | | | |
|---|---|---|---|---|
| 5,734,905 A * | 3/1998 | Oppenheim | .......... | G06F 3/0486 719/315 |
| 7,249,208 B2 * | 7/2007 | Aslot | .................. | G06F 12/1072 370/463 |
| 7,483,964 B1 * | 1/2009 | Jackson | .............. | H04L 12/2809 455/41.1 |
| 7,509,577 B2 * | 3/2009 | Kuwata | .................... | G06F 9/543 709/203 |
| 8,122,122 B1 * | 2/2012 | Clingenpeel | .......... | G06F 21/552 709/203 |
| 8,250,032 B2 * | 8/2012 | Fletcher | .............. | G06F 16/9014 707/627 |
| 8,464,252 B2 * | 6/2013 | Schneider | ........... | G06F 9/45558 718/1 |
| 8,555,187 B2 * | 10/2013 | Margolin | ................ | H04L 67/10 715/748 |
| 8,924,858 B2 * | 12/2014 | Mistry | .................. | G06F 3/0486 715/748 |
| 8,997,179 B2 * | 3/2015 | Kruglick | ................. | H04L 63/08 726/3 |

(Continued)

*Primary Examiner* — Alicia Baturay
(74) *Attorney, Agent, or Firm* — Kirton McConkie; Brian Tucker

(57) ABSTRACT

Multiple clipboard items are supported in a VDI environment. A client clipboard service can monitor the system clipboard to detect when a clipboard item is added to the system clipboard. The client clipboard service can copy any item added to the system clipboard to a client clipboard buffer. The client clipboard service can also interface with a client virtual channel endpoint to send items in the client clipboard buffer to a server virtual channel endpoint. A server clipboard service can then copy the received items to a server clipboard buffer to thereby synchronize the client and server clipboard buffers. The server clipboard service can function in a similar manner to copy items added to the server's system clipboard to the server clipboard buffer and then interface with the server virtual channel endpoint to cause such items to be synchronized back to the client clipboard buffer.

20 Claims, 13 Drawing Sheets

(56) References Cited

U.S. PATENT DOCUMENTS

| | | | | |
|---|---|---|---|---|
| 9,210,162 B2* | 12/2015 | Wright | ............... | H04L 63/0823 |
| 9,325,775 B2* | 4/2016 | Jitkoff | ............... | H04L 67/06 |
| 9,740,390 B2* | 8/2017 | Spikes | ............... | G06F 9/543 |
| 9,774,658 B2* | 9/2017 | Borzycki | ............... | H04L 67/10 |
| 2005/0102670 A1* | 5/2005 | Bretl | ............... | G06F 9/544 |
| | | | | 718/1 |
| 2007/0204166 A1* | 8/2007 | Tome | ............... | H04L 63/0272 |
| | | | | 713/182 |
| 2009/0172581 A1* | 7/2009 | Burling | ............... | G06F 3/0481 |
| | | | | 715/770 |
| 2010/0138502 A1* | 6/2010 | Miller | ............... | G06F 9/543 |
| | | | | 709/206 |
| 2012/0096368 A1* | 4/2012 | McDowell | ............... | G06F 9/543 |
| | | | | 715/748 |
| 2012/0317112 A1* | 12/2012 | Naito | ............... | G06Q 10/10 |
| | | | | 707/737 |
| 2012/0331032 A1* | 12/2012 | Balachandran | ............... | H04L 69/164 |
| | | | | 709/202 |
| 2013/0151484 A1* | 6/2013 | Kruglick | ............... | G06F 16/23 |
| | | | | 707/692 |
| 2014/0013258 A1* | 1/2014 | Jang | ............... | G06F 3/0488 |
| | | | | 715/770 |
| 2014/0025727 A1* | 1/2014 | Ahn | ............... | H04L 67/1095 |
| | | | | 709/203 |
| 2015/0095795 A1* | 4/2015 | Zhang | ............... | G06F 3/0484 |
| | | | | 715/748 |
| 2015/0326575 A1* | 11/2015 | Ramirez Flores | ............... | G06F 21/00 |
| | | | | 726/5 |
| 2017/0346894 A1* | 11/2017 | Zhang | ............... | H04L 67/1095 |

* cited by examiner

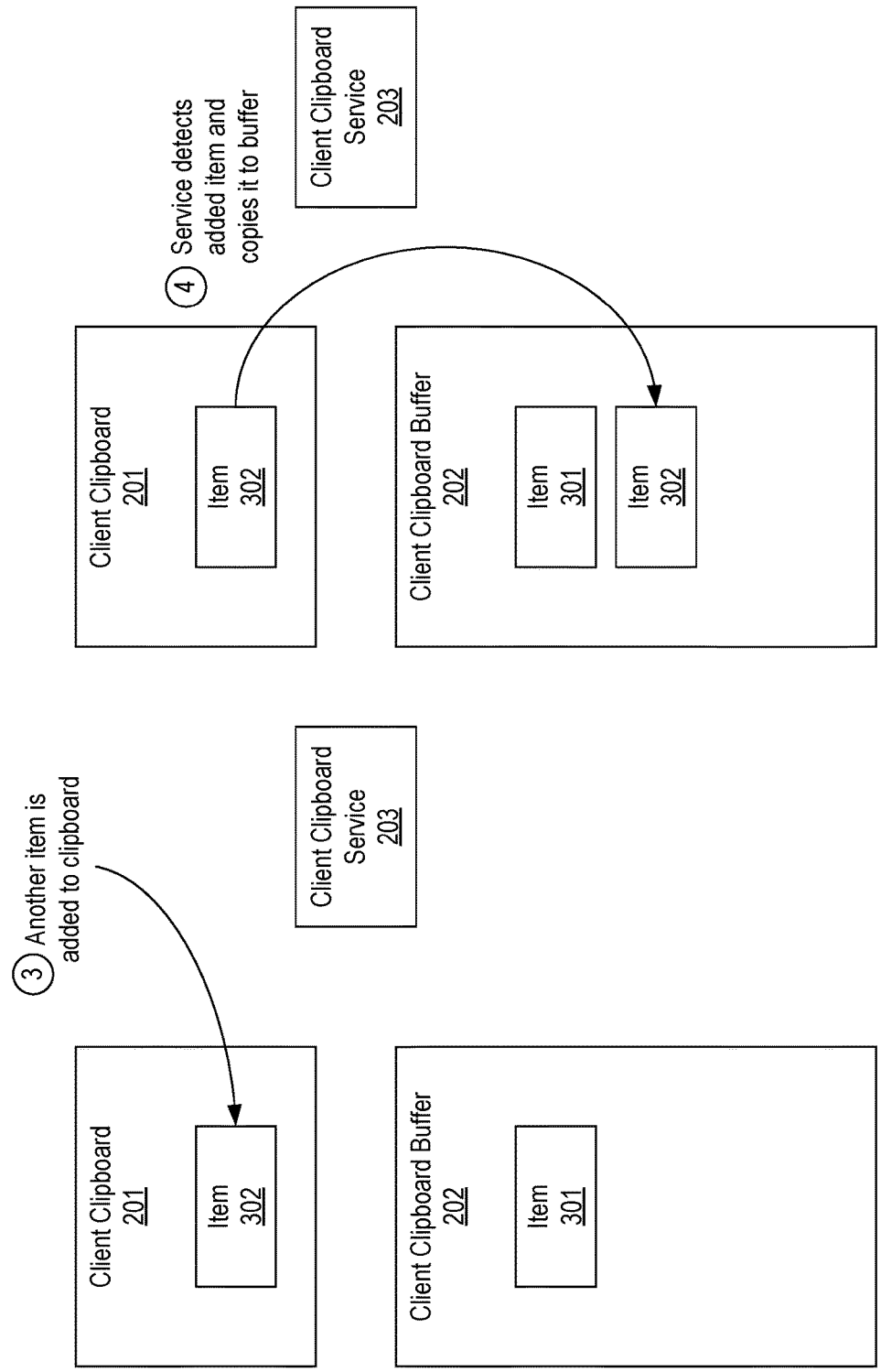

SUPPORTING MULTIPLE CLIPBOARD ITEMS IN A VIRTUAL DESKTOP INFRASTRUCTURE ENVIRONMENT

CROSS-REFERENCE TO RELATED APPLICATIONS

N/A

BACKGROUND

Most operating systems provide a system clipboard (or simply clipboard) which is a temporary storage area for storing copied content so that it can later be pasted. A clipboard can typically store many different types of content including text, graphics, files, folders, etc. The clipboard stores a single "clipboard item" which will be the last content that was copied. Therefore, if the clipboard stores an item when the user performs a copy, the newly copied item will be stored in place of the previously stored item. The previously stored item will therefore be lost.

To address this issue, some tools have been implemented which buffer the items that are added to the clipboard so that they will remain accessible even if an item is overwritten in the clipboard. Such tools typically provide an interface by which the user can select an item from the buffer to be copied back to the clipboard where it will be available to be pasted in a typical manner. Although these tools are useful in a typical desktop environment, they provide minimal benefit in a virtual desktop infrastructure (VDI) environment.

BRIEF SUMMARY

The present invention extends to methods, systems, and computer program products for supporting multiple clipboard items in a VDI environment. A client clipboard service can monitor the system clipboard to detect when a clipboard item is added to the system clipboard. The client clipboard service can copy any item added to the system clipboard to a client clipboard buffer. The client clipboard service can also interface with a client virtual channel endpoint to send items in the client clipboard buffer to a server virtual channel endpoint. A server clipboard service can then copy the received items to a server clipboard buffer to thereby synchronize the client and server clipboard buffers.

The server clipboard service can function in a similar manner to copy items added to the server's system clipboard to the server clipboard buffer and then interface with the server virtual channel endpoint to cause such items to be synchronized back to the client clipboard buffer. When the client has established VDI connections with multiple servers, this process can be performed to synchronize the clipboard buffers of the client and each server.

In one embodiment, the present invention is implemented as a method for supporting multiple clipboard items in a VDI environment. A client clipboard service executing on a client can detect that one or more clipboard items have been added to a client clipboard and copy the one or more clipboard items to a client clipboard buffer. The client clipboard service can also provide the one or more clipboard items to a client virtual channel endpoint to cause the clipboard item to be sent to a server virtual channel endpoint on a first server. A server clipboard service executing on the first server can receive the one or more clipboard items and store the one or more clipboard items in a server clipboard buffer.

In another embodiment, the present invention is implemented as computer storage media storing computer executable instructions which when executed implement the following components of a VDI environment: a client clipboard service that is configured to monitor a client clipboard and copy clipboard items that are added to the client clipboard to a client clipboard buffer; a server clipboard service that is configured to monitor a server clipboard and copy clipboard items that are added to the server clipboard to a server clipboard buffer; a client virtual channel endpoint that is configured to communicate with the client clipboard service to retrieve clipboard items that have been copied to the client clipboard buffer and to send the clipboard items that have been copied to the client clipboard buffer to a server virtual channel endpoint; and the server virtual channel endpoint that is configured to communicate with the server clipboard service to retrieve clipboard items that have been copied to the server clipboard buffer and to send the clipboard items that have been copied to the server clipboard buffer to the client virtual channel endpoint. The client clipboard service is further configured to copy clipboard items that are received from the server virtual channel endpoint to the client clipboard buffer. The server clipboard service is further configured to copy clipboard items that are received from the client virtual channel endpoint to the server clipboard buffer.

In another embodiment, the present invention is implemented as a method for supporting multiple clipboard items in a VDI environment. A server clipboard service executing on a first server detects that a clipboard item has been added to a server clipboard and copies the clipboard item to a server clipboard buffer. The server clipboard service can also provide the clipboard item to a server virtual channel endpoint. The server virtual channel endpoint then sends the clipboard item to a client virtual channel endpoint on a client that has established a VDI connection with the first server. A client clipboard service executing on the client receives the clipboard item and stores the clipboard item in a client clipboard buffer.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIGS. 3A-3F illustrate a sequence of steps that can be performed when a client establishes a VDI connection with a server;

DETAILED DESCRIPTION

In this specification, a "clipboard item" or simply "item" should be construed as any type of content that can be stored in the "system clipboard." For example, when a user highlights a section of text and performs a copy, the highlighted text would be considered a clipboard item. Similarly, if the user copies a file, the file would be considered a clipboard item. Notably, in most operating systems, including Windows, the system clipboard will only store a single item at any given time. The term "VDI connection" should be construed as a connection that is established between a client and a server using a remote display protocol such as RDP, ICA, PCoIP, etc. A VDI connection may be employed to access a remote desktop (in which case the entire desktop will be displayed to the user) or a published application (in which case only the interface of the application will be displayed to the user).

Figure 1:
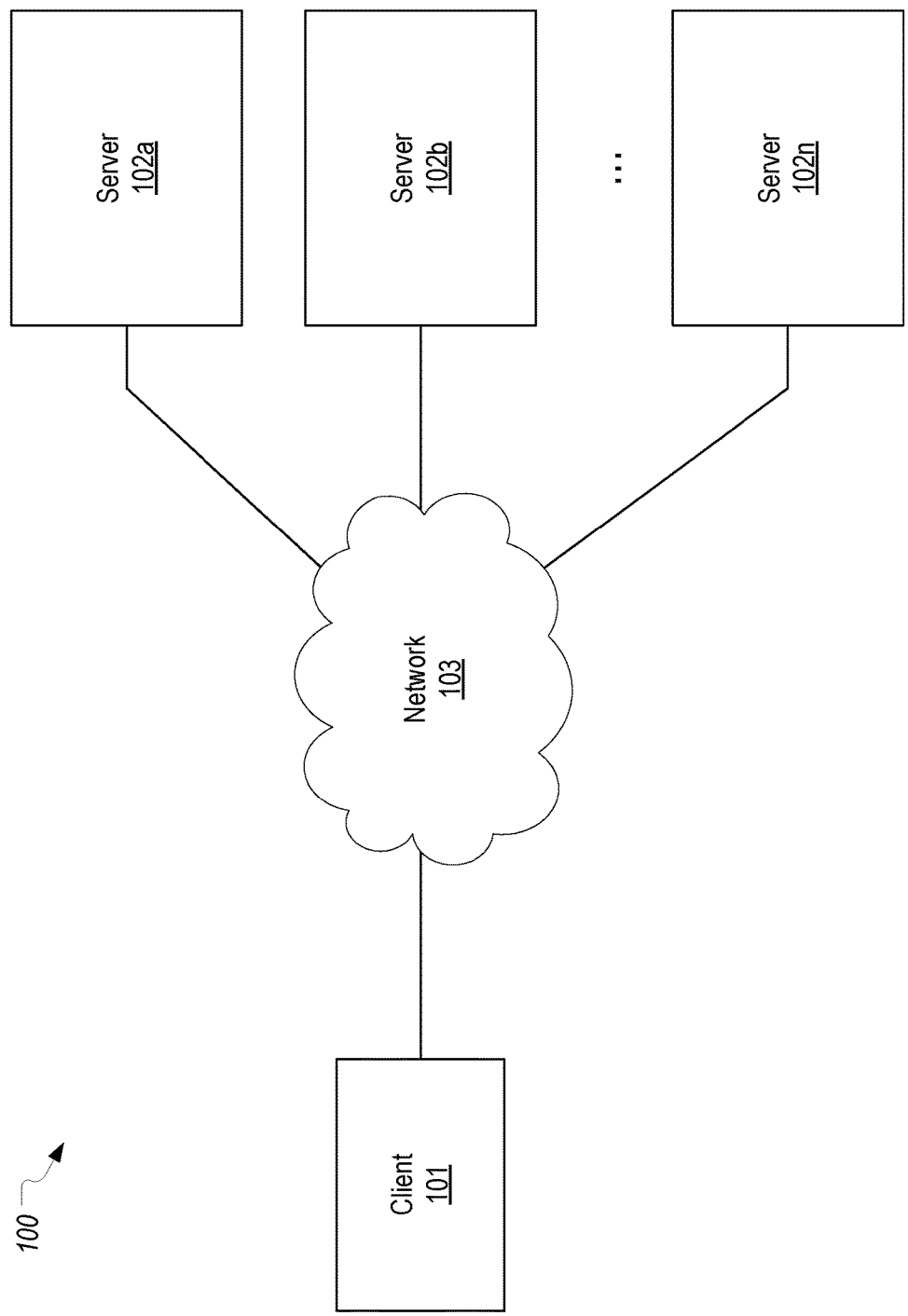
FIG. 1 illustrates an example computing environment in which the present invention can be implemented.

FIG. 1 illustrates an example computing environment 100 in which the present invention can be implemented. Computing environment 100 includes a client 101 and one or more servers 102a-102n that are interconnected via a network 103. Client 101 can be any type of computing device that is capable of executing a VDI client for the purpose of establishing a VDI connection and that includes an operating system that provides a system clipboard. Each of servers 102a-102n (or collectively, server 102) can be any type of computing device that can function as a VDI server for the purpose of allowing users of client 101 to access a remote desktop and/or a published application. Network 103 can be any type of network connection including a LAN or WAN. Since the general components of a VDI environment, including the techniques for establishing a VDI connection, are understood by those of skill in the art, a discussion of these general components and techniques will not be provided.

Figure 2:
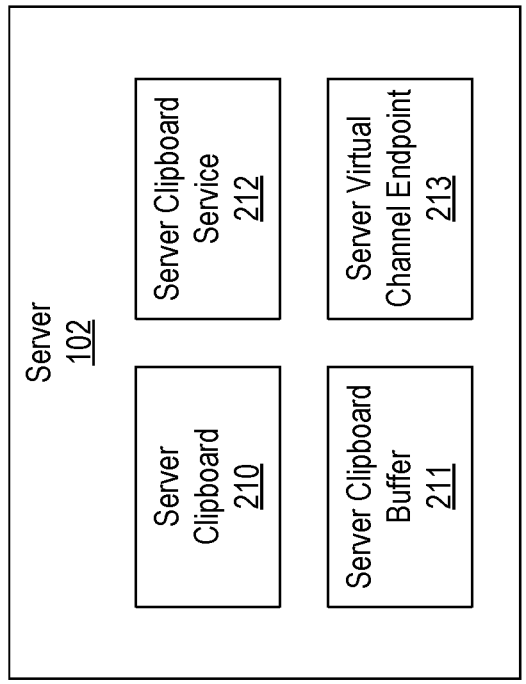
FIG. 2 illustrates various components of a client and a server that can be employed to implement the present invention.
Figure 2:
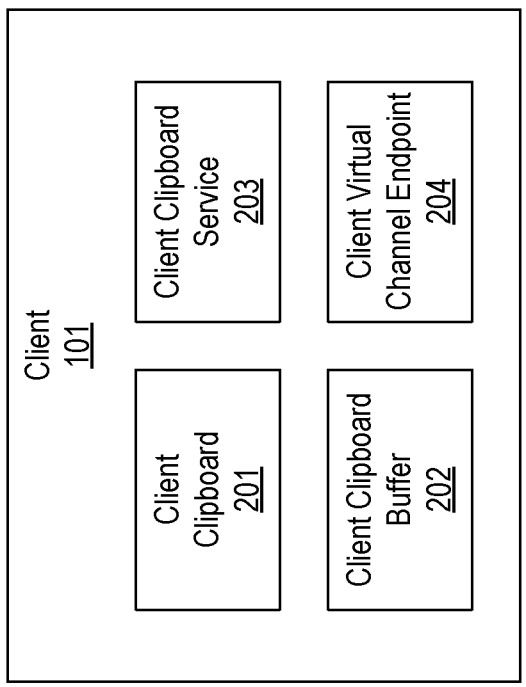

FIG. 2 illustrates various components of client 101 and server 102 that can be employed to implement embodiments of the present invention. As shown, client 101 includes client clipboard 201 while server 102 includes server clipboard 210, both of which can represent the system clipboard provided by the operating system. In accordance with the present invention, client 101 can also include a client clipboard buffer 202, a client clipboard service 203, and a client virtual channel endpoint 204, while server 102 can include a server clipboard buffer 211, a server clipboard service 212, and a server virtual channel endpoint 213.

As an overview, client clipboard buffer 202 and server clipboard buffer 211 can function to buffer items that have been added to client clipboard 201 or server clipboard 210 as will be described in detail below. Client clipboard service 203 and server clipboard service 212 can operate primarily to detect when an item has been added to the corresponding clipboard and, in response, copy the item to the corresponding buffer. Also, while a VDI connection is established between client 101 and server 102, these services 203, 212 will be involved in synchronizing buffers 202, 211. Finally, client virtual channel endpoint 204 and server virtual channel endpoint 213 can represent the components of the VDI that transfer clipboard items between client 101 and server 102. It is noted that, in existing VDI solutions, it is typical to synchronize client clipboard 201 and server clipboard 210 via virtual channel endpoints. In this context, client and server virtual channel endpoints 204, 213 can represent augmented versions of such endpoints. In other words, endpoints 204, 213 may synchronize clipboards 201 and 210 in conjunction with the techniques of the present invention.

FIGS. 3A-3F illustrate how client clipboard service 203 can populate client clipboard buffer 202 with clipboard items that have been added to client clipboard 201 and how clipboard items stored in client clipboard buffer 202 can be synchronized to server clipboard buffer 211 when a VDI connection is established. For sake of illustration, it will be assumed in FIGS. 3A-3D that client 201 has not yet established a VDI connection with server 102.

Figure 3B:
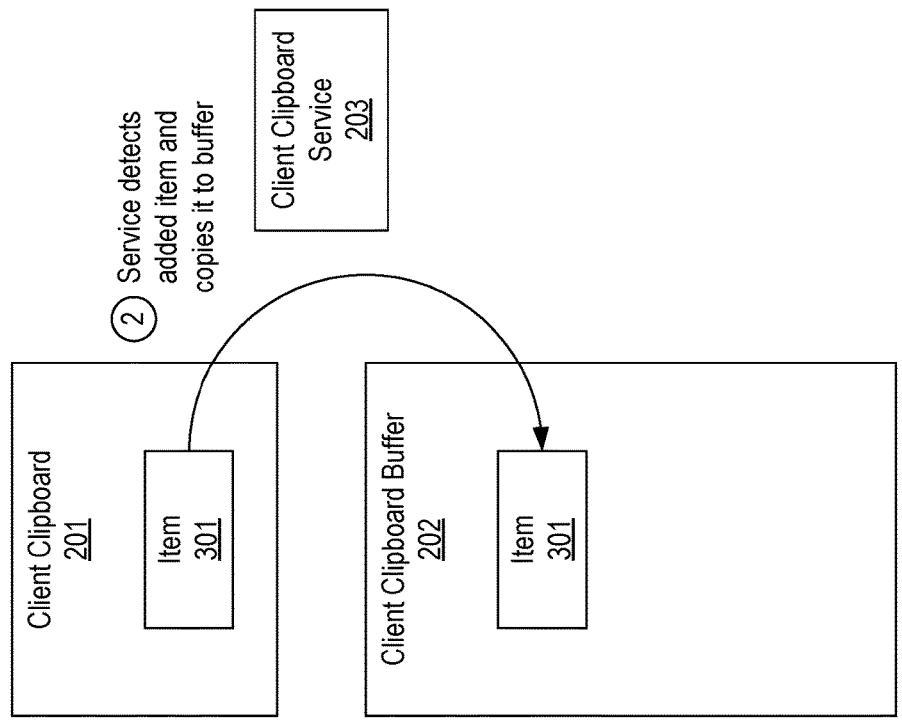
Figure 3A:
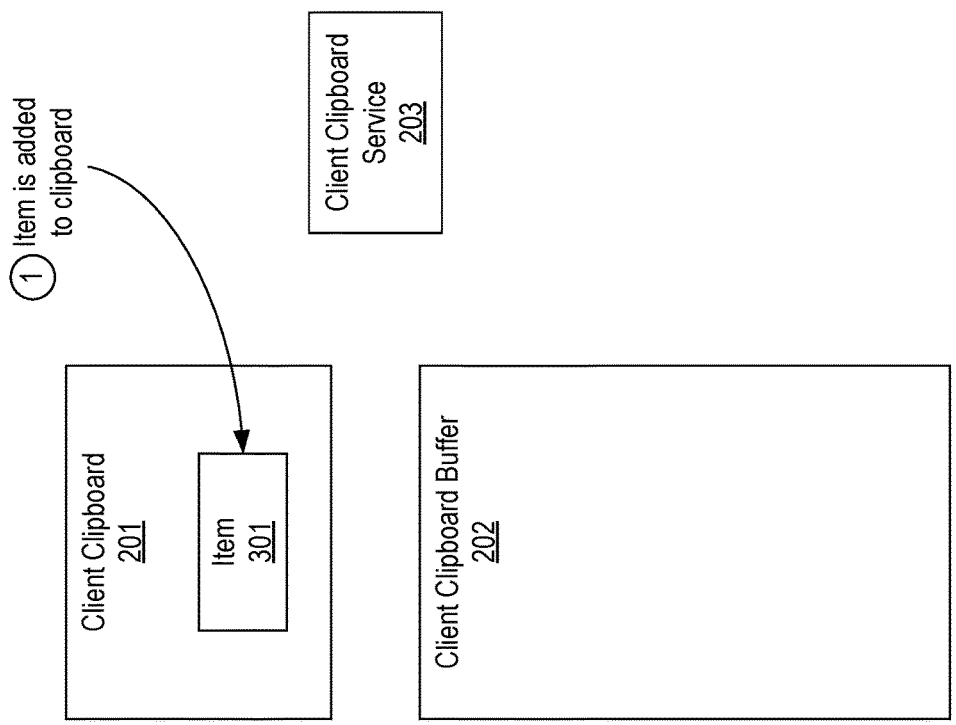

In step 1 shown in FIG. 3A, an item 301 is added to client clipboard 201. Item 301 can represent any type of content that can be stored on client clipboard 201 and could have been stored in response to any application or operating system component invoking the operating-system-provided clipboard functionality. For example, in a Windows embodiment, the user may have performed a control-C while some content or file was selected. Step 1 therefore represents standard copy functionality.

Client clipboard service 203 can be configured to monitor client clipboard 201 to detect when an item has been added. For example, client clipboard service 203 could register a handler for the ContentChanged event in Windows implementations. Equally, client clipboard service 203 could repeatedly poll the clipboard to identify changes to its contents. In any case, client clipboard service 203 will detect that item 301 has been added to client clipboard 201. In response, and in step 2 shown in FIG. 3B, client clipboard service 203 can copy item 301 to client clipboard buffer 202. Item 301 can remain in client clipboard 201 so that it will be available for pasting in a normal fashion.

Next, it will be assumed that another item 302 is copied to client clipboard 201 as shown in FIG. 3C as step 3. Again, item 302 can represent any type of content and can be copied from any application or operating system component. In accordance with standard system clipboard functionality, item 302 will be copied in place of item 301. Client clipboard service 203 will detect that item 302 has been added to client clipboard 201 and, in step 4 shown in FIG. 3D, will copy item 302 to client clipboard buffer 202.

Although not shown, client clipboard service 203 can provide a user interface by which the user can view which items are stored in client clipboard buffer 202 and can request that any of the items be copied back to client clipboard 201 so that they can be pasted in a normal manner. For example, the user may employ this interface to request that item 301 be copied back to client clipboard 201. In this way, even though item 301 has been overwritten in client clipboard 201, it can be restored and will therefore not be lost.

Figure 3E:
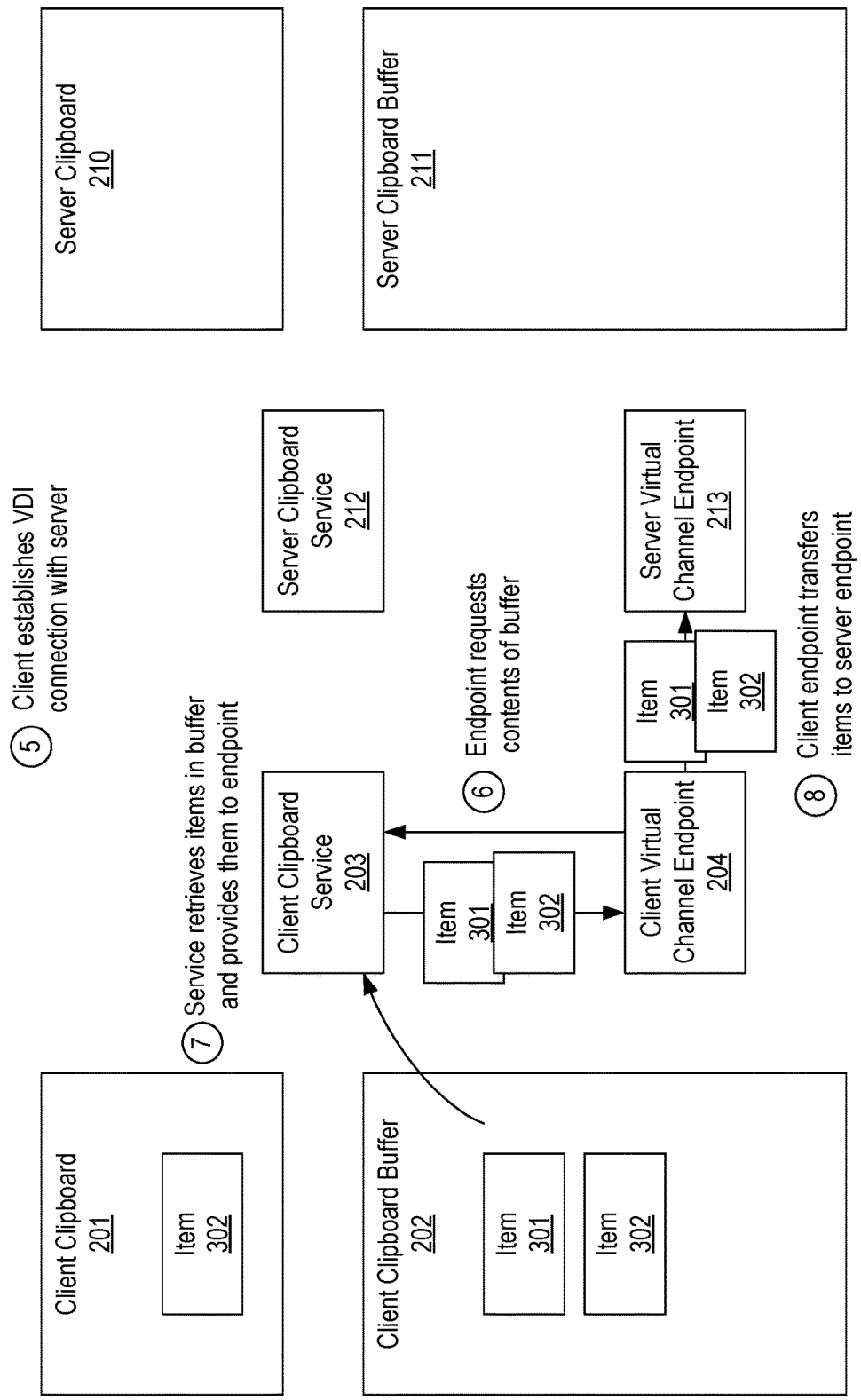

With items 301 and 302 stored in client clipboard buffer 202, it will be assumed that client 101 establishes a VDI connection with server 102 as represented by step 5 in FIG. 3E. As mentioned above, the VDI connection could result in a remote desktop or a single published application being displayed on client 102. As part of establishing the VDI connection, the VDI client (not shown) on client 101 can establish client virtual channel endpoint 204 while the VDI service (not shown) on server 102 can establish server virtual channel endpoint 213. Also, if not already running, the VDI service can launch server clipboard service 212 and possibly allocate server clipboard buffer 211.

The primary role of client virtual channel endpoint 204 and server virtual channel endpoint 213 is to manage the synchronization of client clipboard buffer 202 and server clipboard buffer 211 (as well as to synchronize client clipboard 201 and server clipboard 210). Accordingly, in response to the VDI connection being established, client virtual channel endpoint 204 can query client clipboard service 203 for the contents of client clipboard buffer 202 as represented in FIG. 3E as step 6. Although not shown, client virtual channel endpoint 204 could also retrieve the content of client clipboard 201 in any suitable manner in conjunction with step 6.

In step 7, client clipboard service 203 will retrieve each item (which in this case includes items 301 and 302) from client clipboard buffer 202 and provides them to client virtual channel endpoint 204. Client virtual channel endpoint 204 can then send items 301 and 302 over the VDI connection (or more specifically, over the virtual channel of the VDI connection) to server virtual channel endpoint 213 in step 8.

Figure 3F:
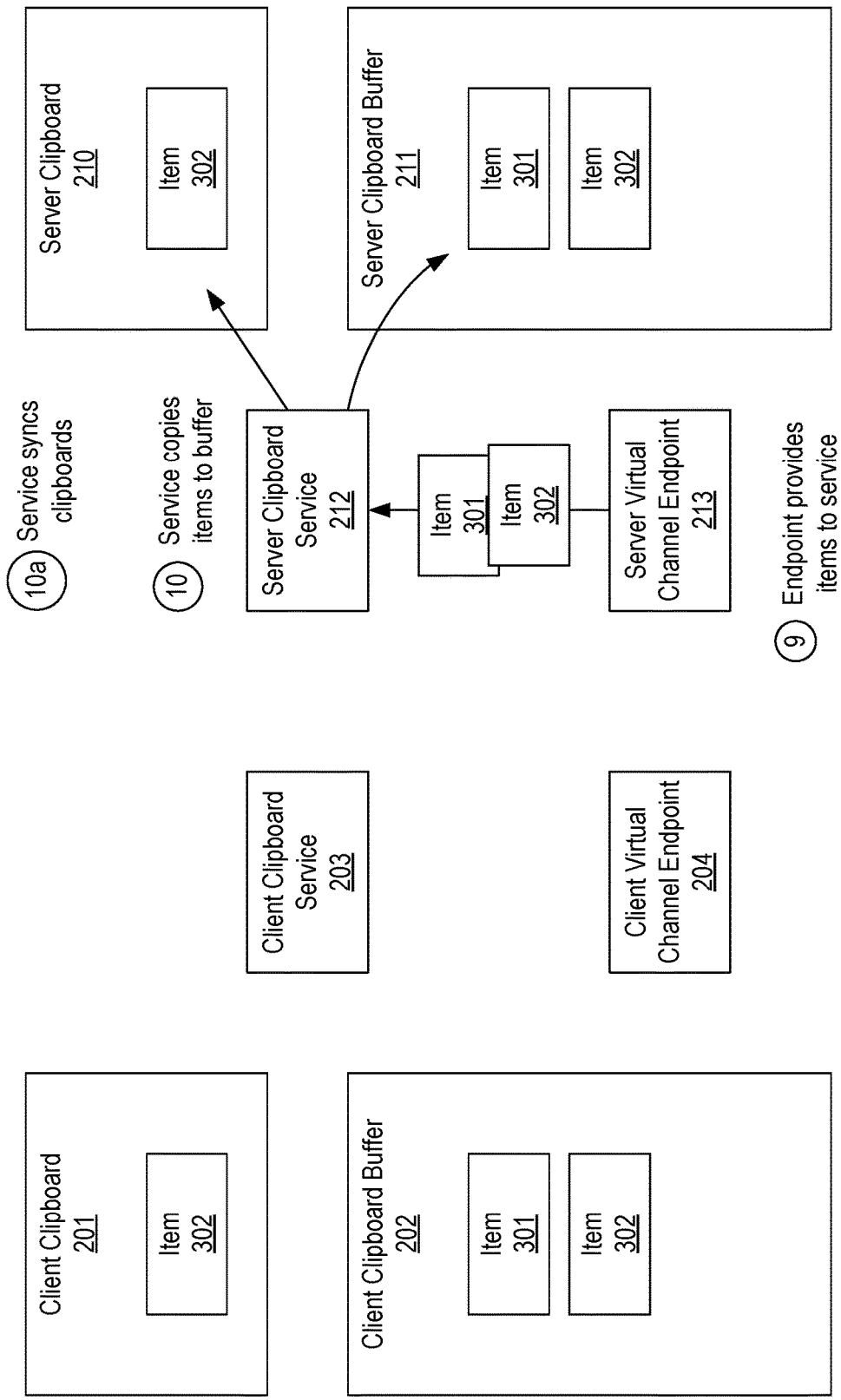

In step 9 shown in FIG. 3F, server virtual channel endpoint 213 will route the received items (items 301 and 302) to server clipboard service 212 which in turn will copy the items to server clipboard buffer 211 in step 10. Also, for sake of illustration, server clipboard service 212 is also shown as copying item 302 to server clipboard 210 in step 10a so that server clipboard 210 is synchronized with client clipboard 201. It is noted, however, that server clipboard service 212 (and equally client clipboard service 203) need not be involved in this process of synchronizing the system clipboards.

The end result of the processing depicted in FIGS. 3A-3F is that both client clipboard buffer 202 and server clipboard buffer 211 will contain the same set of items. Importantly, this will allow items 301 and 302, both of which originated on client 101, to be accessible for pasting within the remote desktop or published application that is executing on server 102. As similarly mentioned above, server clipboard service 212 can include a user interface by which the user can select one of the items in server clipboard buffer 211 to be copied to server clipboard 210. Therefore, if item 301 is text and the user desires to copy the text to a Word document that is executing within a remote desktop or that is executed as a published application (e.g., a Microsoft Remote App or a Citrix Xenapp), the text can be copied from server clipboard buffer 211 to server clipboard 210 so that it will be available for pasting in a typical manner.

While the VDI connection is established, the user may copy items to server clipboard 210. In such a case, server clipboard service 212 can function in much the same manner as client clipboard server 203 to copy such items to server clipboard buffer 211. Similarly, if the user copies items to client clipboard 201, client clipboard service 203 can copy the items to client clipboard buffer 202. In other words, client clipboard service 203 may copy items from client clipboard 201 to client clipboard buffer 202 whether or not a VDI connection is established. In some embodiments, this functionality can be controlled by policy. For example, in some embodiments, the VDI client may enable the use of client clipboard buffer 202 only after a VDI connection is established and only if clipboard redirection is enabled.

FIGS. 4A-4D illustrate an example of how client clipboard buffer 202 and server clipboard buffer 211 can be synchronized while a VDI connection is established. These figures will be based on the example provided in FIGS. 3A-3F and therefore it will be assumed that items 301 and 302 exist in both client clipboard buffer 202 and server clipboard buffer 211.

Figure 4A:
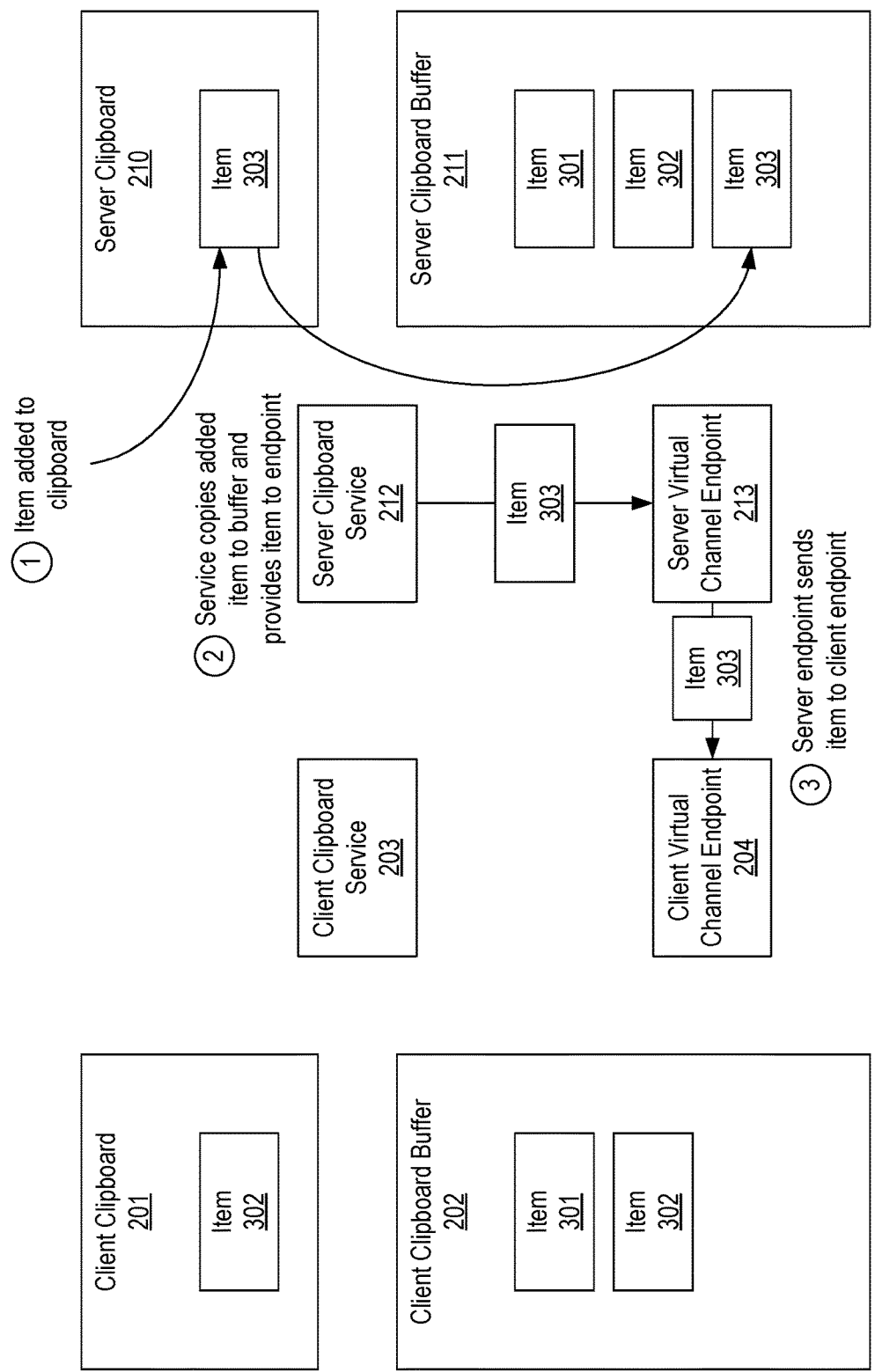
FIGS. 4A-4D illustrate a sequence of steps that can be performed while the client maintains a VDI connection with the server.

In step 1 shown in FIG. 4A, it will be assumed that an item 303 is added to server clipboard 210. For example, item 303 could be added in response to the user performing a control-C while content is selected within the remote desktop or published application (as opposed to in response to the user providing input to a locally-executing application or the local desktop). In step 2, server clipboard service 212 can copy item 303 from server clipboard 210 to server clipboard buffer 211. As mentioned above, server clipboard service 212 could be registered to be notified or may otherwise detect when the content of server clipboard 210 is changed.

In conjunction with copying item 303 to server clipboard buffer 211, server clipboard service 212 can also provide item 303 to server virtual channel endpoint 213 to allow server virtual channel endpoint 213 to send item 303 to client virtual channel endpoint 204 in step 3. Server clipboard service 212 could be configured to provide items to server virtual channel endpoint 213 in various ways. For example, whenever server clipboard service 212 adds an item to server clipboard buffer 211, it may also automatically provide the item to server virtual channel endpoint 213 or notify server virtual channel endpoint 213 to query for the new item. Alternatively, server virtual channel endpoint 213 could be configured to periodically query server clipboard service 212 for any new items (or possibly all items) in server clipboard buffer 211. In any case, server clipboard service 212 and server virtual channel endpoint 213 can be configured to interoperate for the purpose of sending items added to server clipboard buffer 211 to client 101.

Figure 4B:
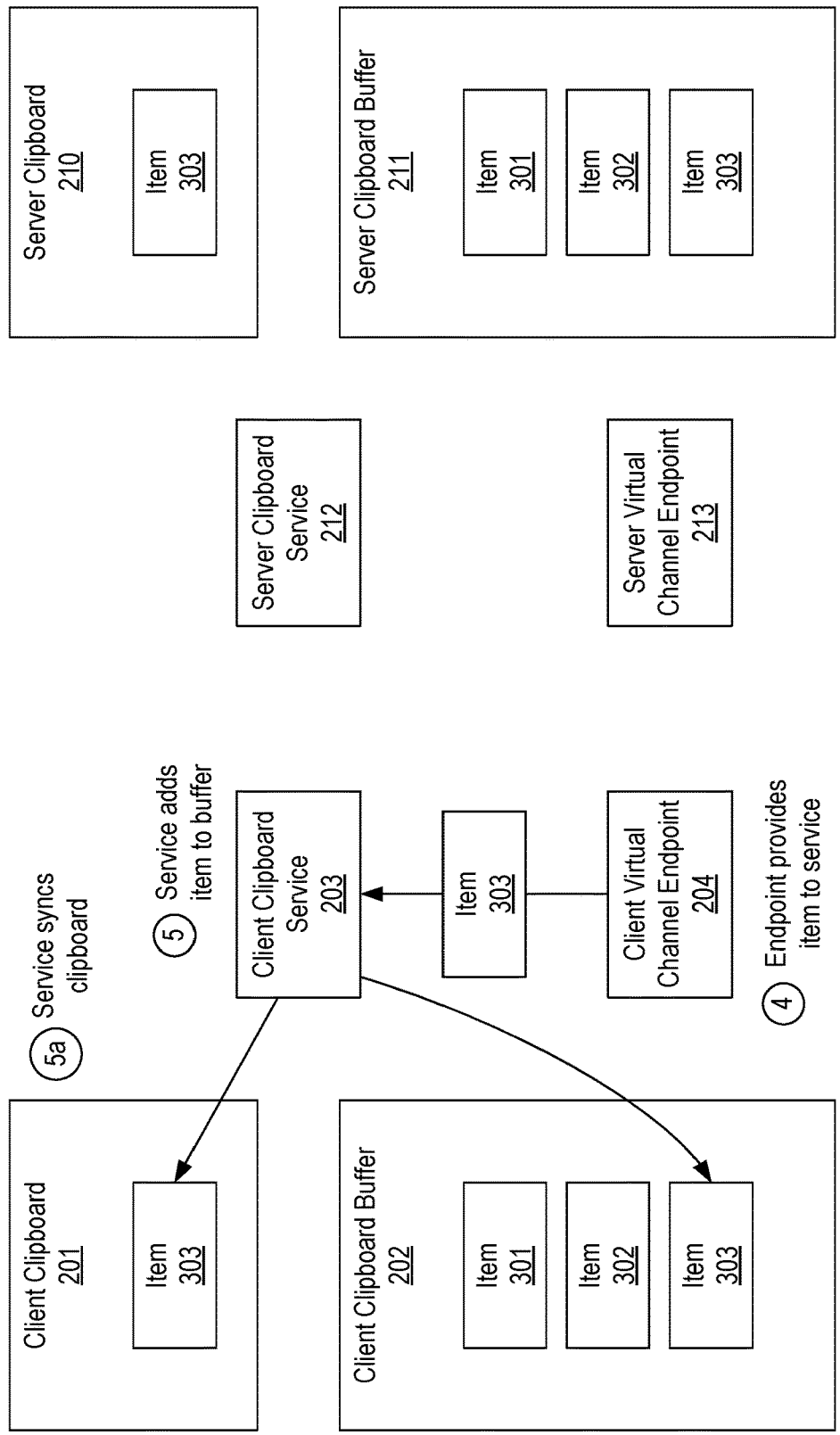

In FIG. 4B, and in response to receiving item 303 from server virtual channel endpoint 213, client virtual channel endpoint 204 will provide item 303 to client clipboard service 203 in step 4. In step 5, client clipboard service 203 will add item 303 to client clipboard buffer 202 to thereby synchronize client clipboard buffer 202 to server clipboard buffer 211. FIG. 4B also represents that client clipboard service 203 may also copy item 303 to client clipboard 201 to synchronize client clipboard 201 to server clipboard 210. As mentioned above, however, this synchronization of the system clipboards may be performed independently of the synchronization of the clipboard buffers and is therefore shown for illustrative purposes only. In this state, each of items 301-303 will be available to paste both locally and remotely.

Figure 4C:
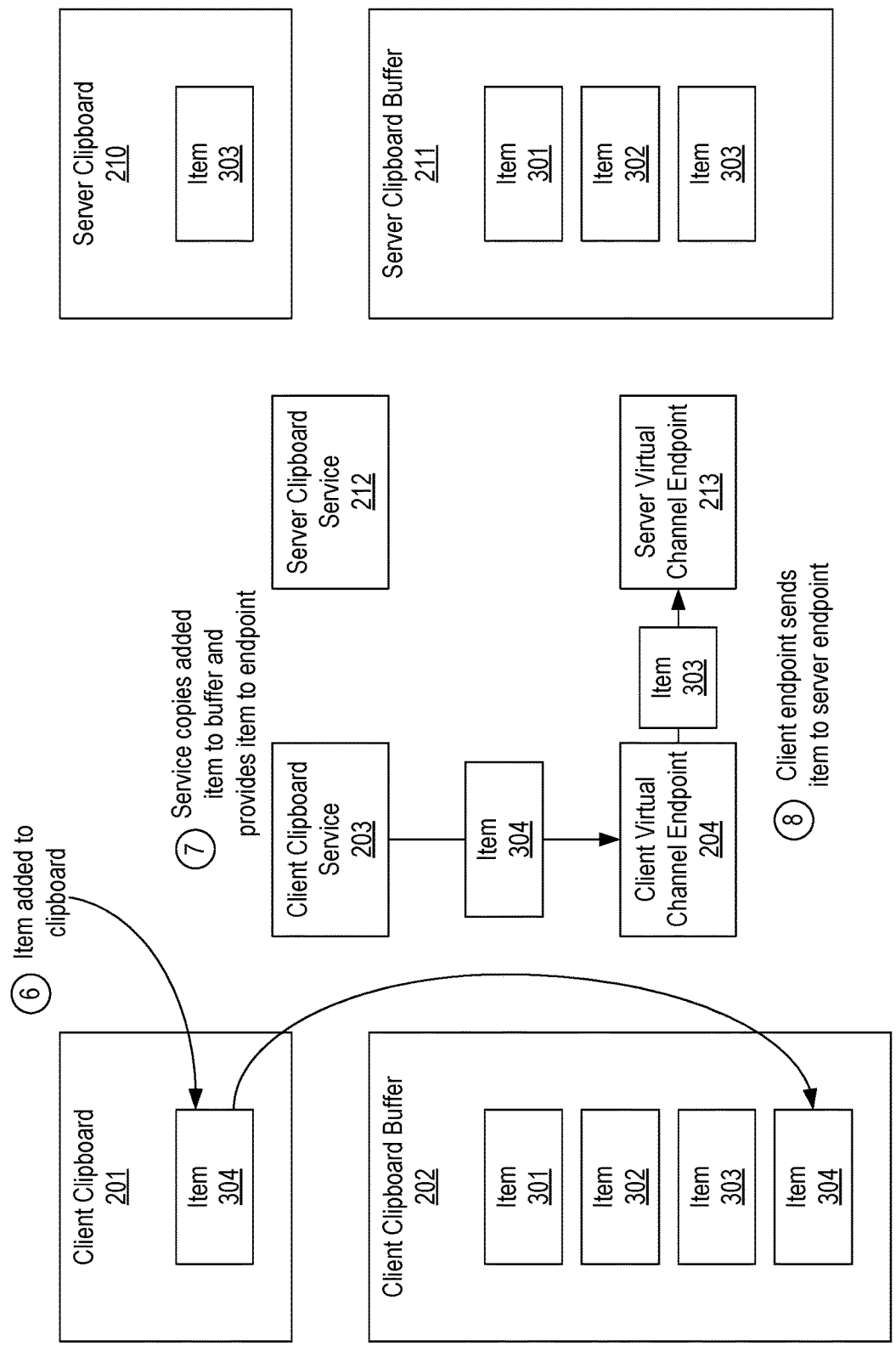
Figure 4D:
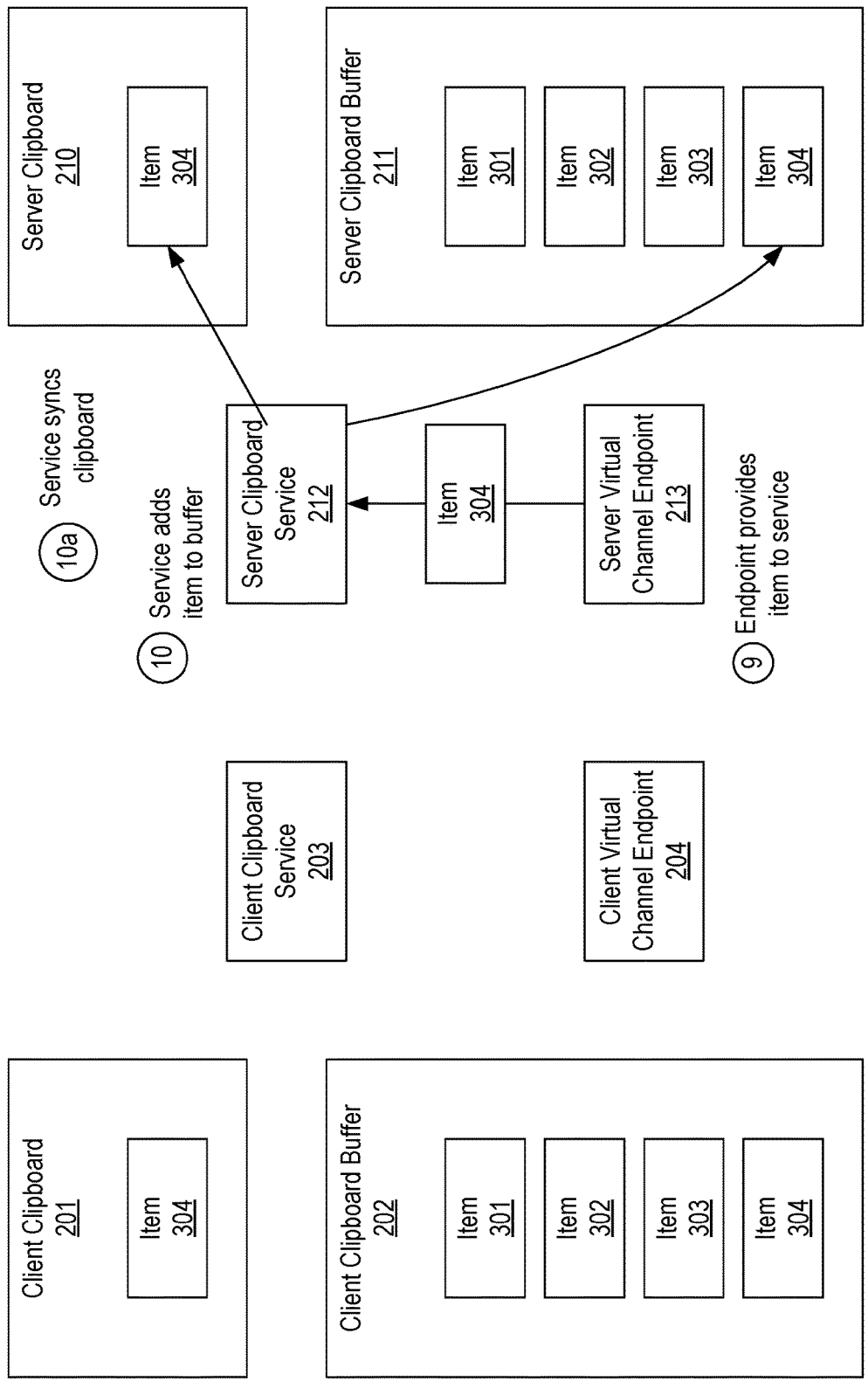

FIGS. 4C and 4D illustrate that an essentially reverse process can be performed when an item 304 is added to client clipboard 201. In particular, in step 6 it is assumed that item 304 is copied to client clipboard 201. In response, client clipboard service 203 copies item 304 to client clipboard buffer 202 and provides item 304 to client virtual channel endpoint 204 in step 7. Again, the exact manner in which client clipboard service 203 provides items to client virtual channel endpoint 204 may vary. In any case, client virtual channel endpoint 204 will send item 303 to server virtual channel endpoint 213 in step 8.

Turning to FIG. 4D, server virtual channel endpoint 213 provides item 304 to server clipboard service 212 in step 9. Then, server clipboard service 212 adds item 304 to server clipboard buffer 211 in step 10. Additionally, server clipboard service 212 (or possibly another service) may add item 304 to server clipboard 210 as represented in step 10a. As a result of this processing, item 304 in addition to items 301-303 will be available for pasting within the remote desktop or published application.

In addition to synchronizing client clipboard buffer 202 to server clipboard buffer 211 on one server, the present invention can also perform this synchronization when client 101 has established a VDI connection with more than one server 102. In such cases, client clipboard buffer 202 and each server clipboard buffer 211 can be synchronized to thereby make clipboard items accessible across VDI sessions.

Figure 5A:
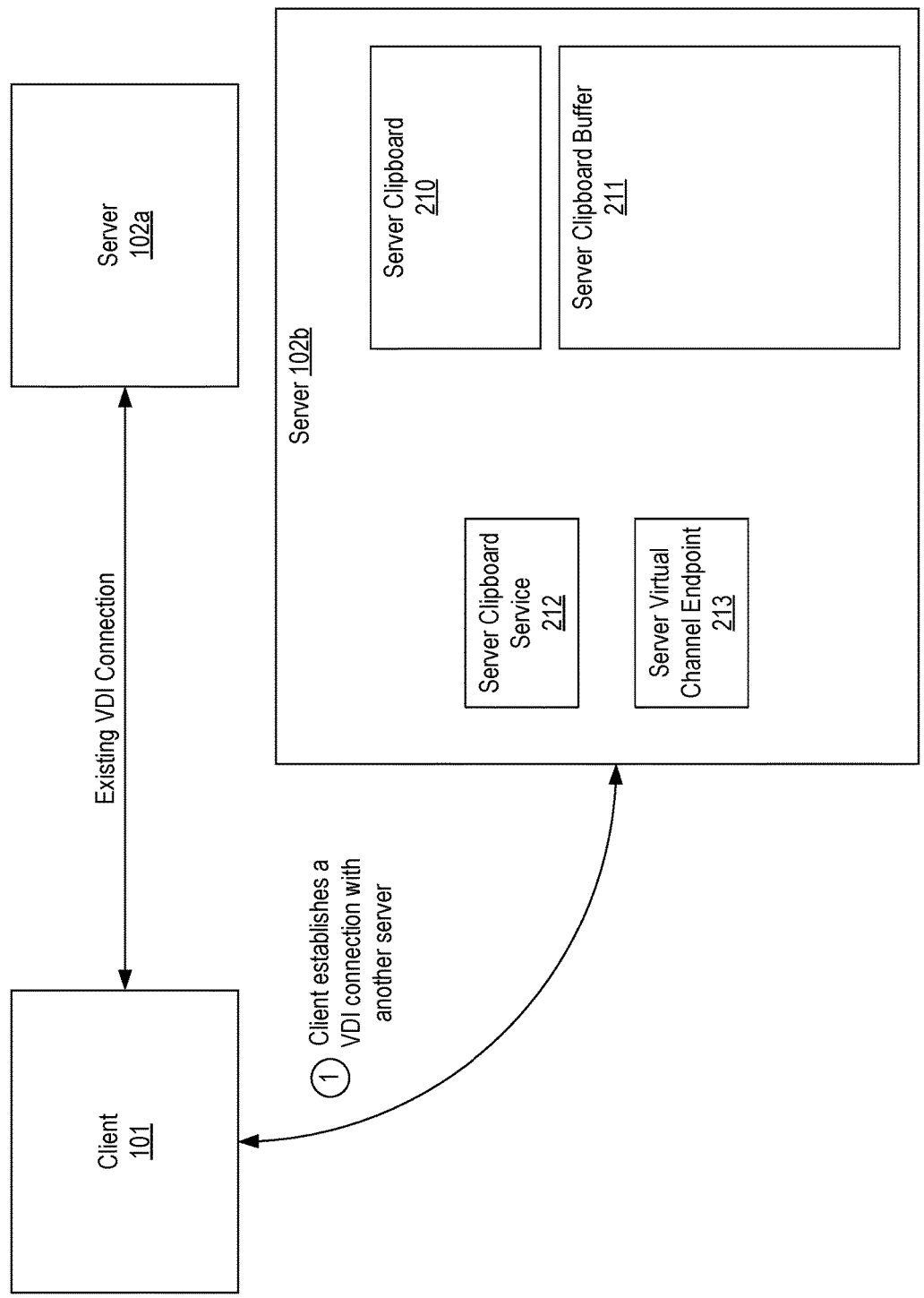
FIGS. 5A and 5B illustrate a sequence of steps that can be performed when the client establishes a VDI connection with another server.
Figure 5B:
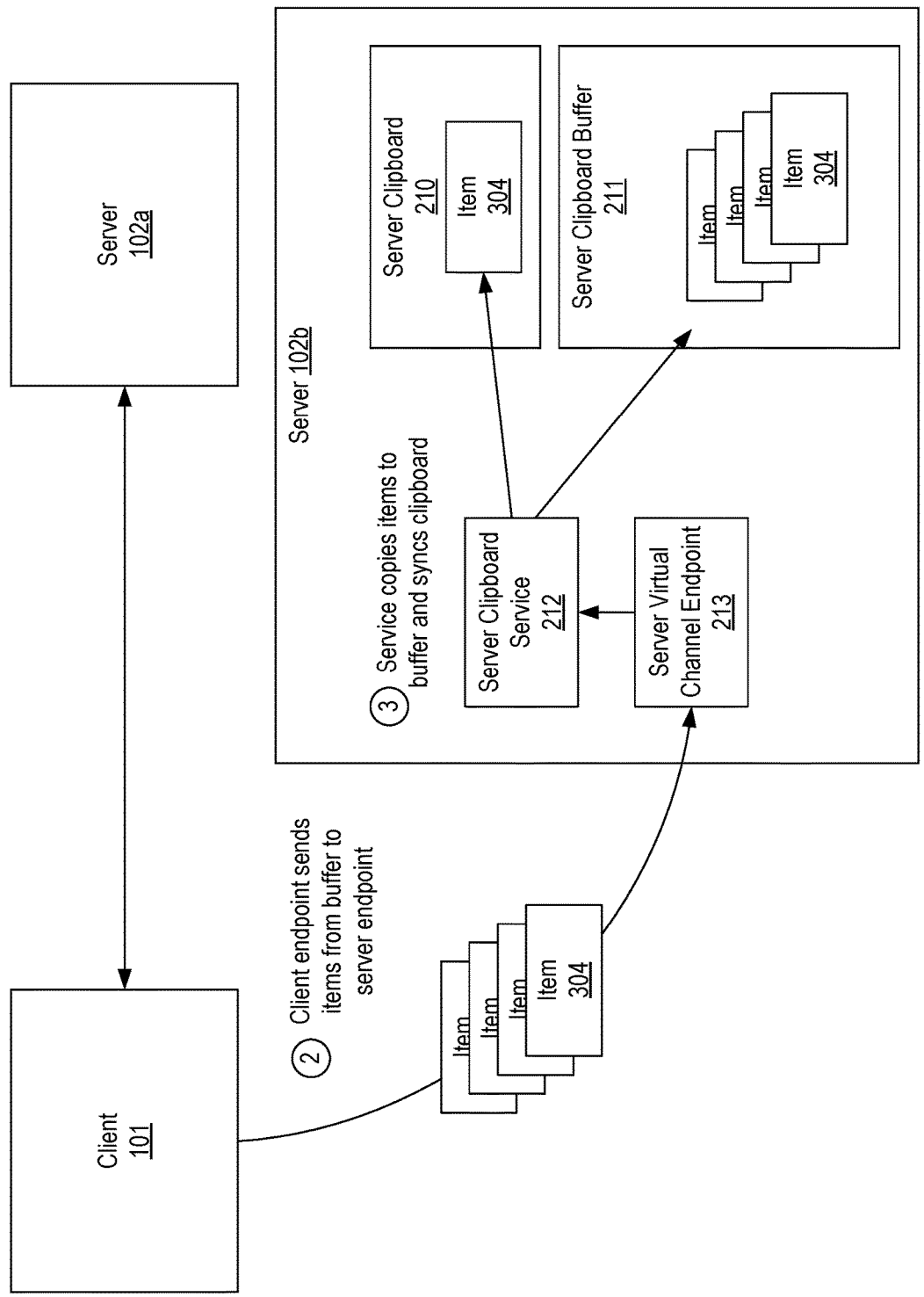

FIGS. 5A and 5B provide an example of how this synchronization may occur when client 101 has a VDI connection with two servers 102. For purposes of this example, it will be assumed that the server depicted in FIGS. 3A-3F and 4A-4D is server 102*a* and that client 101 establishes a VDI connection with server 102*b* while this VDI connection with server 102 is established. It will also be assumed that client 101 establishes the VDI connection with server 102*b* after the sequence of steps shown in FIGS. 4A-4D.

In FIG. 5A, client 101 (or the VDI client on client 101) establishes a VDI connection with server 102*b* in step 1. This VDI connection may be for the purpose of accessing a remote desktop or a single published application. As part of establishing this VDI connection, a server virtual channel endpoint 213 will be established on server 102*b*. Also, a server clipboard service 212 and server clipboard buffer 211 may be launched/allocated. In other words, server 102*b* can include the same components as server 102*a*. As shown, server clipboard buffer 211 may initially be empty.

At this point, the same process shown in FIGS. 3E and 3F can be performed to synchronize server clipboard buffer 211 with client clipboard buffer 202. For example, in FIG. 5B, step 2 represents client virtual channel endpoint 204 sending items 301-304 (which are assumed to be stored in client clipboard buffer 202 as a result of the processing represented in FIGS. 4A-4D) to server virtual channel endpoint 213. These four items will be provided to server clipboard service 212 which will copy them to server clipboard buffer 211 in step 3. It is also assumed that server clipboard service 212 copies item 304 to server clipboard 210 to thereby synchronize it with client clipboard 201.

Although not shown in FIG. 5B, after this processing, server clipboard buffer 211 on both servers 102*a* and 102*b* as well as client clipboard buffer 202 will include items 301-304. Therefore, all four items will be available for pasting locally, within a remote desktop or application on server 102*a*, and within a remote desktop or application on server 102*b*. Again, the client and server clipboard services can provide an interface to allow the user to specify which item to copy to the corresponding system clipboard.

If an item is copied to any of the system clipboards, the corresponding service can copy the item to the corresponding buffer which will in turn initiate the process of synchronizing the item to the other buffers. For example, if the user copies an item to server clipboard 210 on server 102*b*, a process similar to what is shown in FIGS. 4A and 4B will be performed to cause the item to be stored in server clipboard buffer 211 on server 102*b* and in client clipboard buffer 202. The addition of the item to client clipboard buffer 202 will in turn initiate a process similar to what is shown in FIGS. 4C and 4D to cause the item to be copied to server clipboard buffer 211 on server 102*a*.

Although the above examples depict a case where only new items are sent over the virtual channel, it is also possible that the virtual channel endpoint can send all items contained in the clipboard buffer whenever it is notified of a change to the buffer. In such a case, the service that receives the items can compare the received items to the items that are already stored in the buffer and only add items that are not already present. Therefore, the exact manner in which clipboard buffers are synchronized is not essential to the invention.

The present invention can be particularly beneficial in VDI environments where a user may establish multiple concurrent VDI connections (which is often the case in published application environments). Using existing system clipboard redirection techniques, the content of the client clipboard will be synchronized to the server clipboard whenever a VDI connection is established. As a result, if the server with which the client establishes a VDI connection already has content in its system clipboard, this content would be overwritten with the contents of the client's system clipboard when the VDI connection is established. Such may be the case when a user reestablishes a VDI connection that was previously disconnected (e.g., when the remote session was not terminated such that the content of the clipboard was not discarded). This can lead to frustration as the user's content that was present on the clipboard prior to a disconnection is lost. By implementing the present invention, this loss of clipboard content would not occur thereby improving the user experience.

Figure 6:
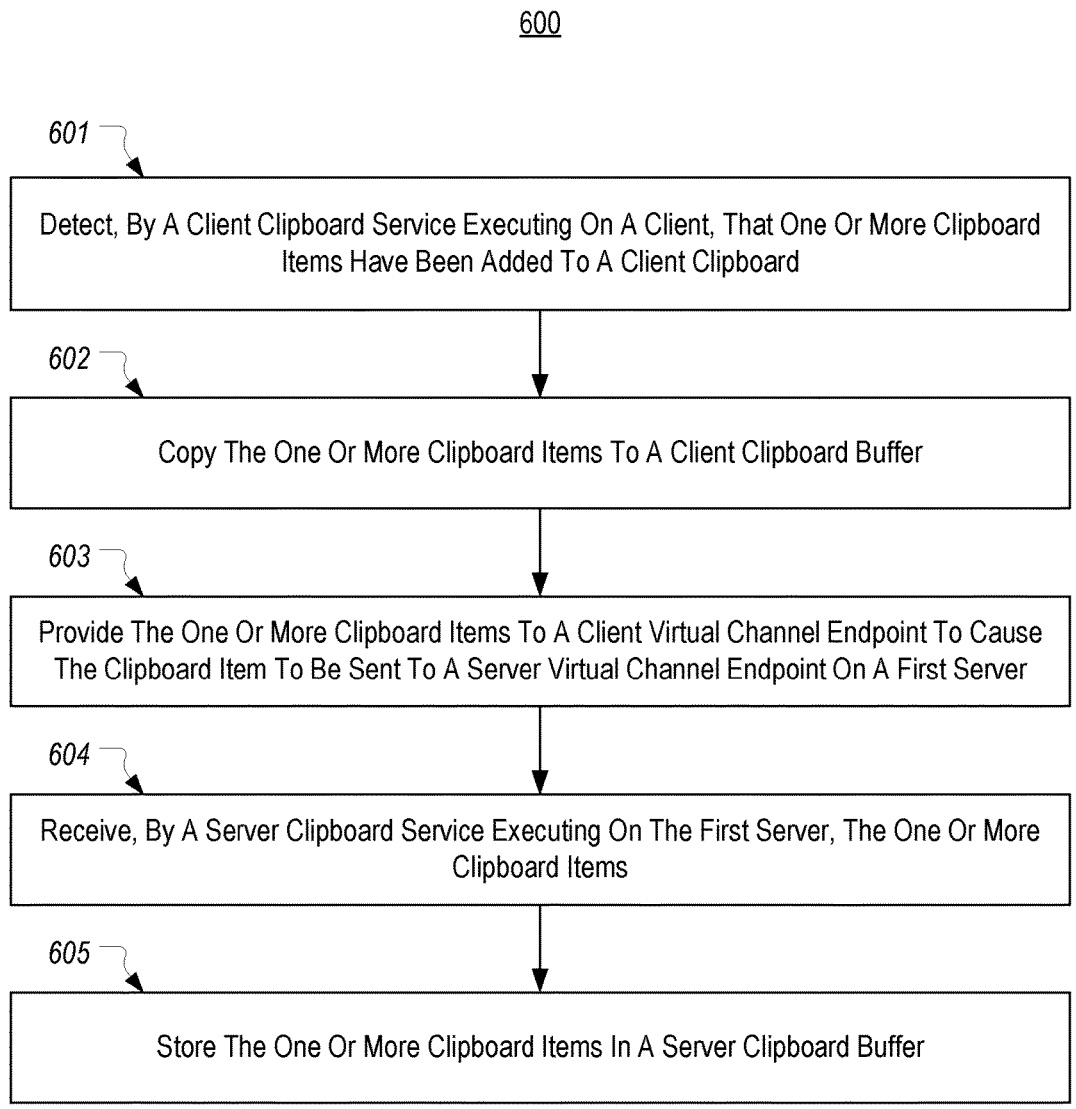
FIG. 6 illustrates a flowchart of an example method for supporting multiple clipboard items in a VDI environment.

FIG. 6 provides a flowchart of an example method 600 for supporting multiple clipboard items in a VDI environment. Method 600 can be implemented in a VDI environment that includes a client, such as client 102, and at least one server, such as servers 102*a*-102*n*, with which the client can establish VDI connections.

Method 600 includes an act 601 of detecting, by a client clipboard service executing on a client, that one or more clipboard items have been added to a client clipboard. For example, client clipboard service 203 can detect that items 301 and 302 are added to client clipboard 201.

Method 600 includes an act 602 of copying the one or more clipboard items to a client clipboard buffer. For example, client clipboard service 203 can copy items 301 and 302 to client clipboard buffer 202.

Method 600 includes an act 603 of providing the one or more clipboard items to a client virtual channel endpoint to cause the clipboard item to be sent to a server virtual channel endpoint on a first server. For example, client clipboard service 203 can provide items 301 and 302 to client virtual channel endpoint 204 to cause client virtual channel endpoint 204 to send the items to server virtual channel endpoint 213. Client clipboard service 203 may provide items 301 and 302 to client virtual channel endpoint 204 at the same time (e.g., as part of establishing a VDI connection) or at different times (e.g., in response to each item being added to client clipboard buffer 202 while a VDI connection is established).

Method 600 includes an act 604 of receiving, by a server clipboard service executing on the first server, the one or more clipboard items. For example, server clipboard service 212 can receive items 301 and 302. These items may be received at the same or at different times.

Method 600 includes an act 605 of storing the one or more clipboard items in a server clipboard buffer. For example, server clipboard service 212 can store items 301 and 302 in server clipboard buffer 211.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for supporting multiple clipboard items in a virtual desktop infrastructure (VDI) environment comprising:
    detecting, by a client clipboard service executing on a client, that one or more clipboard items have been added to a client clipboard;
    copying the one or more clipboard items to a client clipboard buffer;
    while the client has established a VDI connection with a first server to thereby cause a user interface of a desktop or an application that is executing on the first server to be displayed on the client, providing the one or more clipboard items to a client virtual channel endpoint of the VDI connection to cause the clipboard item to be sent to a server virtual channel endpoint of the VDI connection;
    receiving, by a server clipboard service executing on the first server, the one or more clipboard items that were sent to the server virtual channel endpoint; and
    storing the one or more clipboard items in a server clipboard buffer on the first server to thereby enable the one or more clipboard items to be copied to a server clipboard to thereby cause the one or more clipboard items to be accessible to the desktop or the application that is executing on the first server.

2. The method of claim 1, wherein the one or more clipboard items are stored in the client and server clipboard buffers at the same time.

3. The method of claim 1, wherein the one or more clipboard items are sent to the server virtual channel endpoint at the same time.

4. The method of claim 3, wherein the one or more clipboard items are sent to the server virtual channel endpoint in response to the client establishing the VDI connection with the first server.

5. The method of claim 1, wherein at least one of the one or more clipboard items is sent to the server virtual channel endpoint in response to the clipboard item being copied to the client clipboard buffer.

6. The method of claim 5, wherein the client clipboard service notifies the client virtual channel endpoint when the at least one of the one or more clipboard items is copied to the client clipboard buffer, and the client virtual channel endpoint requests the at least one of the one or more clipboard items in response to the notification.

7. The method of claim 1, further comprising:
    detecting, by the server clipboard service, that an additional clipboard item has been added to the server clipboard;
    copying the additional clipboard item to the server clipboard buffer;
    providing the additional clipboard item to the server virtual channel endpoint to cause the additional clipboard item to be sent to the client virtual channel endpoint;
    receiving, by the client clipboard service, the additional clipboard item; and
    storing the additional clipboard item in the client clipboard buffer to thereby enable the additional clipboard item to be copied to the client clipboard to thereby cause the additional clipboard item to be accessible to a desktop or an application executing on the client.

8. The method of claim 7, wherein the additional clipboard item is stored in the client and server clipboard buffers with the one or more clipboard items.

9. The method of claim 7, further comprising:
    sending the one or more clipboard items and the additional clipboard item to a server virtual channel endpoint on a second server;
    receiving, by a server clipboard service on the second server, the one or more clipboard items and the additional clipboard item; and
    storing the one or more clipboard items and the additional clipboard item in a server clipboard buffer on the second server such that the client clipboard buffer, the server clipboard buffer on the first server, and the server clipboard buffer on the second server store the one or more clipboard items and the additional clipboard item.

10. The method of claim 9, wherein the one or more clipboard items and the additional clipboard item are sent to the server virtual channel endpoint on the second server in response to the client establishing a second VDI connection with the second server.

11. The method of claim 9, further comprising:
    in response to another clipboard item being copied to the client clipboard buffer, providing the other clipboard item to the client virtual channel endpoint to be sent to either or both of the server virtual channel endpoint on the first server or the server virtual channel endpoint on the second server.

12. The method of claim 11, wherein the other clipboard item is copied to the client clipboard buffer in response to the other clipboard item being added to the client clipboard, and wherein the other clipboard item is sent to both the server virtual channel endpoint on the first server and the server virtual channel endpoint on the second server.

13. One or more computer storage media storing computer executable instructions which when executed implement the following components of a virtual desktop infrastructure (VDI) environment:
  a client clipboard service that executes on a client and that is configured to monitor a client clipboard and copy clipboard items that are added to the client clipboard to a client clipboard buffer;
  a server clipboard service that executes on a server and that is configured to monitor a server clipboard and copy clipboard items that are added to the server clipboard to a server clipboard buffer;
  a client virtual channel endpoint that is configured to communicate with the client clipboard service to retrieve clipboard items that have been copied to the client clipboard buffer and to send the clipboard items that have been copied to the client clipboard buffer to a server virtual channel endpoint; and
  the server virtual channel endpoint that is configured to communicate with the server clipboard service to retrieve clipboard items that have been copied to the server clipboard buffer and to send the clipboard items that have been copied to the server clipboard buffer to the client virtual channel endpoint;
  wherein the client clipboard service is further configured to copy clipboard items that are received from the server virtual channel endpoint to the client clipboard buffer to thereby enable the clipboard items that are received from the server virtual channel endpoint to be copied to a client clipboard to thereby cause the clipboard items that are received from the server virtual channel endpoint to be accessible to a desktop or an application that is executing on the client, and
  wherein the server clipboard service is further configured to copy clipboard items that are received from the client virtual channel endpoint to the server clipboard buffer to thereby enable the clipboard items that are received from the client virtual channel endpoint to be copied to a server clipboard to thereby cause the clipboard items that are received from the client virtual channel endpoint to be accessible to a desktop or an application that is executing on the server while a user interface of the desktop or the application that is executing on the server is displayed on the client.

14. The computer storage media of claim 13, wherein the client virtual channel endpoint is configured to send the clipboard items that have been copied to the client clipboard buffer to a server virtual channel endpoint on more than one server.

15. The computer storage media of claim 13, wherein the client virtual channel endpoint is configured to send the clipboard items that have been copied to the client clipboard buffer to the server virtual channel endpoint in response to the client establishing a VDI connection with the server.

16. The computer storage media of claim 13, wherein the client virtual channel endpoint is configured to send the clipboard items that have been copied to the client clipboard buffer to the server virtual channel endpoint in response to the clipboard items being copied to the client clipboard buffer.

17. The computer storage media of claim 16, wherein the client clipboard service notifies the client virtual channel endpoint when a clipboard item is copied to the client clipboard buffer, and the server clipboard service notifies the server virtual channel endpoint when a clipboard item is copied to the server clipboard buffer.

18. A method for supporting multiple clipboard items in a virtual desktop infrastructure (VDI) environment comprising:
  detecting, by a server clipboard service executing on a first server, that a clipboard item has been added to a server clipboard;
  copying the clipboard item to a server clipboard buffer;
  while the first server has established a VDI connection with a client to thereby cause a user interface of a desktop or an application that is executing on the first server to be displayed on the client, providing the clipboard item to a server virtual channel endpoint of the VDI connection;
  sending, by the server virtual channel endpoint, the clipboard item to a client virtual channel endpoint of the VDI connection;
  receiving by a client clipboard service executing on the client, the clipboard item that was sent to the client virtual channel endpoint; and
  storing the clipboard item in a client clipboard buffer on the client to thereby enable the clipboard item to be copied to a client clipboard to thereby cause the clipboard item to be accessible to a desktop or an application that is executing on the client while the user interface of the desktop or the application that is executing on the first server is also displayed on the client.

19. The method of claim 18, further comprising:
  sending, by the client virtual channel endpoint, the clipboard item to a server virtual channel endpoint on a second server with which the client has established a second VDI connection;
  receiving, by a server clipboard service executing on the second server, the clipboard item; and
  storing the clipboard item in a server clipboard buffer on the second server.

20. The method of claim 19, further comprising:
  detecting, by the client clipboard service, that a second clipboard item has been added to a client clipboard;
  copying the second clipboard item to the client clipboard buffer;
  providing the second clipboard item to the client virtual channel endpoint; and
  sending the second clipboard item to the server virtual channel endpoint on the first server to cause the second clipboard item to be stored in the server clipboard buffer on the first server and to the server virtual channel endpoint on the second server to cause the second clipboard item to be stored in the server clipboard buffer on the second server.

* * * * *